United States Patent

[11] 3,557,860

| [72] | Inventor | Luigi Maiocchi<br>Milan, Italy |
|---|---|---|
| [21] | Appl. No. | 819,346 |
| [22] | Filed | Apr. 25, 1969 |
| [45] | Patented | Jan. 26, 1971 |
| [73] | Assignee | Pirelli, S.p.A.<br>Milan, Italy |
| [32] | Priority | Apr. 30, 1968 |
| [33] | | Italy |
| [31] | | 15,898 |

[54] RADIAL TIRE BEAD CONSTRUCTION
6 Claims, 4 Drawing Figs.

[52] U.S. Cl. ......... 152/362
[51] Int. Cl. .......... B60c 15/06
[50] Field of Search ........... 152/362, 362CS

[56] References Cited
UNITED STATES PATENTS

| 2,947,341 | 8/1960 | Hershey | 152/362 |
| 3,038,518 | 6/1962 | Hershey | 152/362 |
| 3,013,599 | 12/1961 | Riggs | 152/362 |
| 3,118,482 | 1/1964 | Beissner | 152/362(X) |
| 3,406,733 | 10/1968 | Boileau | 152/362 |
| 3,460,599 | 8/1969 | Leach | 152/362 |

FOREIGN PATENTS

| 970,772 | 9/1964 | Great Britain | 152/362 |

Primary Examiner—Milton Buchler
Assistant Examiner—Carl A. Rutledge
Attorney—Stevens, Davis, Miller & Mosher ABSTRACT: A pneumatic tire of the radial carcass type having reinforced sidewalls in the region adjacent to the bead rings.

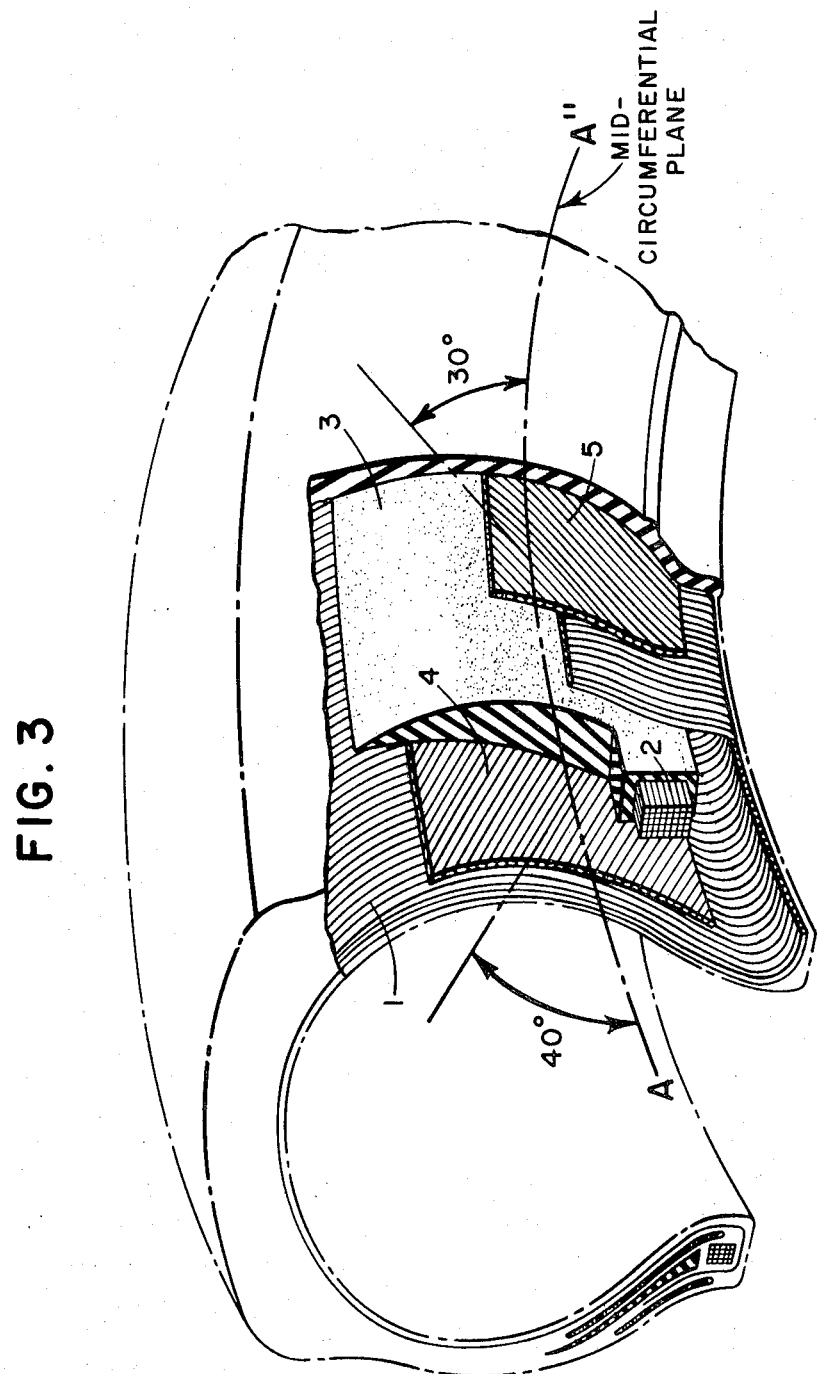

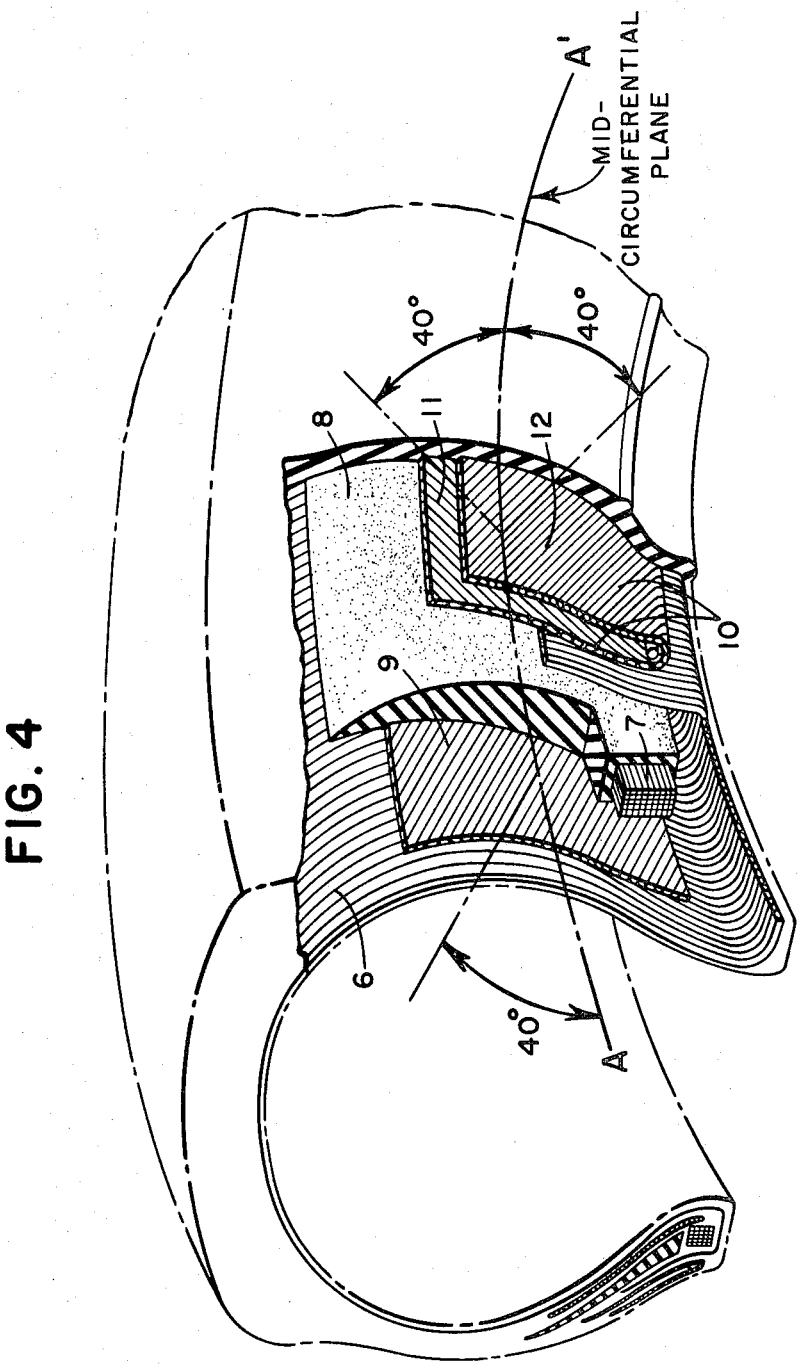

RADIAL TIRE BEAD CONSTRUCTION

The present invention is directed to improvements in the construction of the bead region in pneumatic tires and particularly those having a radial carcass, that is: a carcass whose cords lie in meridian planes or whose cords form small angles relative to such planes.

It is well known that radial tires deform considerably in a vertical direction under load. The consequent repeated flexing of the tire sidewalls combined with the stresses imposed thereon result in premature deterioration of the tire sidewalls at their lower region, that is: the region extending from the end of the rim flange up to that point at which the width of the tire cross section is a maximum. Such deterioration is the result mainly of friction with the rim flange and of detachment and rupture of the carcass plies in said lower region.

To eliminate the above disadvantages, it has been proposed to stiffen the beads and to this end the beads are built up in such a way as to include, besides the metallic bead ring and the carcass plies turned up about it, reinforcements of various kind, generally enclosed by one or more covers which are wound at the same time about the bead ring, and which extend within said lower region of the sidewall. Such arrangements, however, are not devoid of drawbacks. In fact, since the reinforcements are more rigid than the carcass plies, relative to flexibility, the neutral axis of the whole structure passes through them. When the pneumatic tire is subjected to load, because of the deformations occurring in the lower portion of the sidewall at the rim flange, the tension is increased in the carcass plies located inwardly of said reinforcement and is decreased or totally eliminated in the outer plies, and in fact in said outer plies a condition of compression of the cords may be reached, which, as is known, is considerably prejudicial, as the cords are unable to withstand compression stresses.

An object of the present invention is the provision of a radial tire in which the bead rings have a higher resistance than conventional beads, and which obviate the above indicated disadvantages.

The foregoing object is realized through the provision of a pneumatic tire, having a radial carcass, in which the beads comprise at least a bead ring of metal wires about which the carcass plies are turned up, said carcass plies being all turned up towards the outer side, and including a triangular filler made of high rigidity rubber or the like above the bead ring, and reinforcing elements constituted by two groups of strips of cord fabric, each group being constituted by one or more strips, the first group being placed inwardly of the bead, between the carcass plies and the triangular filler, and the second group being placed outwardly of the bead and of the carcass plies and alongside the turned-up portion of said plies, said groups of strips extending radially from a point approximately at the height of the inner periphery of the bead ring to at least one-sixth of the height of the tire section.

In the present description, the expression "outer side of the bead" means the side directed towards the rim flange, and the expression "inner side of the bead" means the side directed towards the tire cavity.

In one embodiment of the invention, the groups of strips of cord fabric extend to a height of between one-sixth and one-half of the height of the tire section.

In another embodiment of the invention, the respective groups of strips of cord fabric extend radially to different heights; specifically: the inner group extends to a height of between one-fifth and one-half of the tire section, whilst the outer group extends to a height of between one-sixth and one-third of the tire section height. The reinforcing elements here described can be made of strips of cord fabric, either of textile material or of metallic material. The textile material can be, for instance, any organic textile material, as cotton, rayon, polyamide or polyester fibers, and so on.

The advantage deriving from the use of the reinforcing elements of the invention is due to the fact that it is possible to affect the rigidity of the beads by varying at will the resistance to tension of the inner side of the bead and the resistance to compression of the outer side of the same.

In fact, taking into account that the disposition of said reinforcing elements is such that the neutral axis of the whole structure lies in the zone between the group of reinforcing strips disposed on the inner side of the bead and the turned-up portion of the carcass plies, said axis can be displaced at will within this zone in accordance with the choice of material forming the cord fabric of the reinforcing strips, the disposition of one or more strips on the inner or outer sides of the bead, and by positioning the strips in such a way that their cords are inclined at an appropriate angle with respect to the midcircumferential plane of the tire. As regards this latter point, the position of the cords is preferably such that the cords of the groups of strips on the inner side and those of the group on the outer side form different angles with respect to said plane, it being understood that the cords of one strip run in a direction opposite to that of the cords of the other strip.

The groups of strips can also be positioned in such a way that the cords of the inner group and the cords of the outer group form respective equal and symmetrical angles with respect to the midcircumferential plane of the tire; in this case the rigidity of the bead is dependent upon the number of strips in each of the two groups of reinforcing elements or upon the particular material of which said strips in each group are composed. The value of the angle of inclination of the cords with respect to the midcircumferential plane is in any event between 20° and 60°.

The invention will be better understood with reference to the attached drawings, given by way of nonlimiting example, in which:

FIGS. 3 and 4 are pictorial partially broken away views of respective tires constructed in accordance with the embodiments of FIGS. 1 and 2, respectively.

FIG. 1 shows in cross section the bead of a tire, in which the carcass 1 is radial and which, as known, consists of one or more plies.

Figure 1:
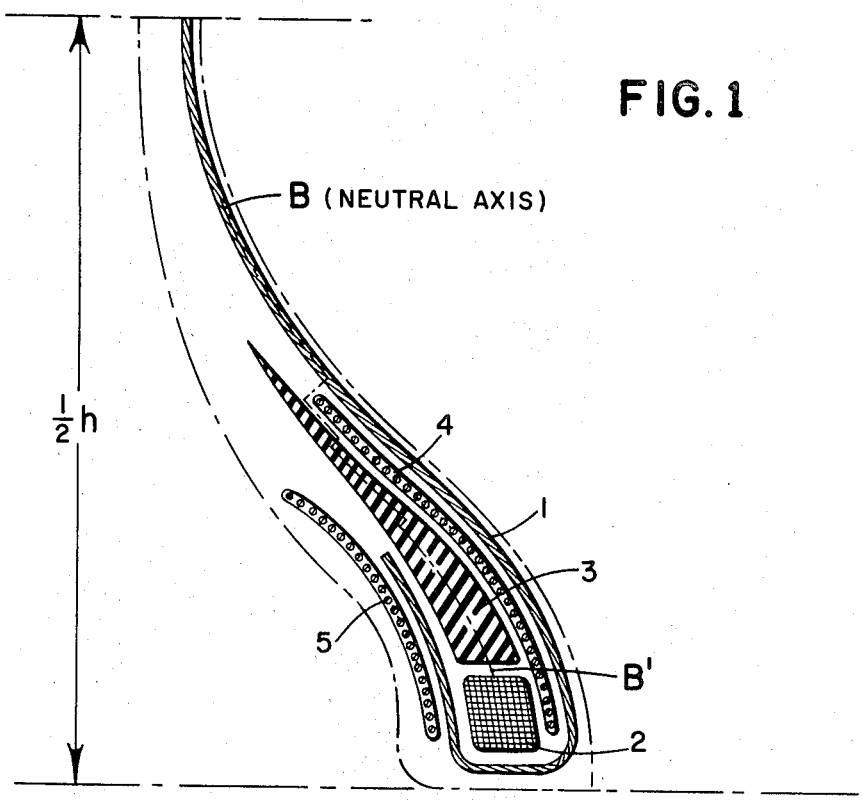
FIG. 1 represents in cross section the bead of a radial tire in accordance with the invention.

For the sake of clearness, the carcass is represented as consisting of a single ply, turned up about the bead ring 2. A filler 3, made of hard rubber, is disposed over the ring. A reinforcing strip 4 of cord fabric of metallic material is disposed between the carcass plies and the rubber filler, said strip extending radially to a height equal to one-fourth of the height $h$ of the tire section. On the outer side of the bead ring, outwardly of the turned-up end of the carcass plies, there is a further reinforcing strip 5 of cord fabric of metallic material, which extends radially up to a height equal to one-fifth of the height $h$ of the tire section. The reinforcing strips 4 and 5 are positioned in such a way—with respect to the midcircumferential plane of the tire—that their cords are respectively inclined at angles of 40° and 30° and in opposite directions.

Figure 2:
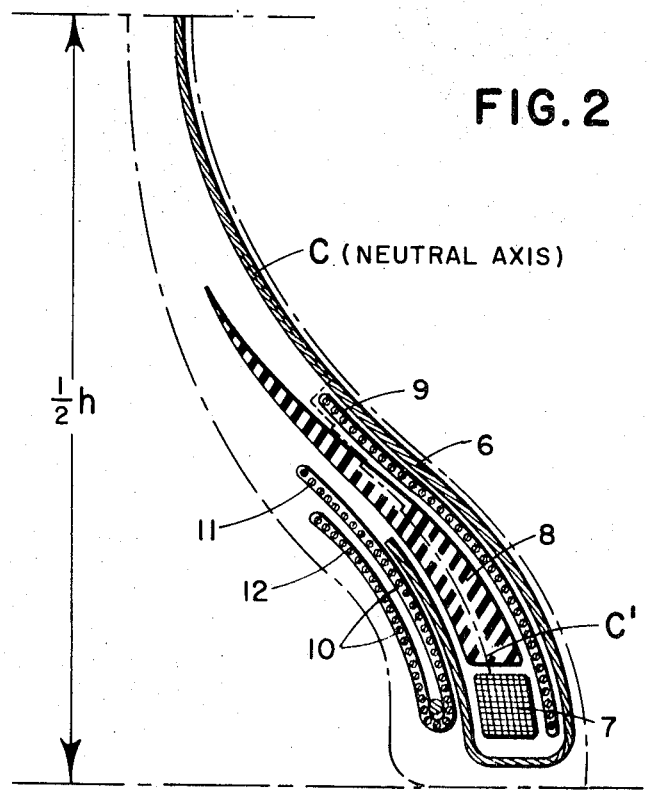
FIG. 2 represents an alternative embodiment of the invention.

FIG. 2 illustrates an alternative embodiment of the invention. In particular, it represents in cross section the bead of a tire having a radial carcass consisting of plies 6 turned up about the bead ring 7. A filler 8 of hard rubber is disposed over the bead ring. A reinforcing strip 9 of cord fabric of metallic material is disposed between the carcass plies and the rubber filler, said strip extending up to a height equal to one-fourth of the height of $h$ of the tire section. On the outer side of the bead, outwardly of the turned-up ends of the carcass plies, there is a further reinforcing strip 10 of cord fabric of textile material, folded in such a way that the fold line lies approximately at the height of the inner periphery of the bead ring and the end of the highest leg 11 terminates at a height equal to one-fifth of the height $h$ of the tire section, whilst the end of the other leg 12 is offset with respect to the first by 10 to 20 mm.

The reinforcing strip 9 is positioned in such a way that its cords are inclined at an angle of 40° with respect to the midcircumferential plane of the tire, whilst the reinforcing strip is positioned in such a way that the cords of the leg 11 nearest to the turned-up ends of the plies 9 are inclined at an angle equal to that of the cords of the strip 9, but in a direction opposite thereto. Obviously, the cords of the two legs 11 and 12 of the reinforcing strip 10 will be inclined with respect to the midcircumferential plane at equal and symmetrical angles, having the above indicated value.

In both FIGS. 1 and 2 it is seen that the reinforcing strips commence at a height which is substantially that of the inner periphery of the bead rings.

Various details given herein of the construction of two embodiments of the invention are only illustrative of the inventive concept which, of course, may be susceptible to various modifications, substitutions, etc., without departing from the inventive concept disclosed herein.

I claim:

1. A pneumatic radial type tire including a carcass ply means having opposite end portions which are respectively turned up outwardly around respective bead rings, said tire further including a triangular filler made of high rigidity material and located radially over each bead ring, a first reinforcing strip means of cord fabric located between said carcass ply means and the inner side of a said ring and a said filler, and a second reinforcing strip means of cord fabric located outwardly of each said end portion, said first and second strip means extending within the tire sidewall radially from a point substantially at the same height as the inner periphery of a said ring and for at least one-sixth of the height of the tire section.

2. The tire of claim 1, wherein said filler is of rubber.

3. The tire of claim 1, said first and second strip means extending radially within the tire sidewall to a height up to one-half the height of the tire section.

4. The tire of claim 3, said first strip means extending to a height in the range of one-fifth to one-half of the height of the tire section and said second strip means extending to a height in the range of one-sixth to one-third of the height of the tire section.

5. The tire of claim 1, wherein said strip means is composed of a cord fabric selected from the group consisting of textile and metallic materials.

6. The tire of claim 1, the cords in said first and second strip means being respectively oppositely inclined at an angle of from 20° to 60° relative to the midcircumferential plane of the tire.

UNITED STATES PATENT OFFICE
CERTIFICATE OF CORRECTION

Patent No. 3,557,860                Dated January 26, 1971

Inventor(s) Luigi MAIOCCHI

It is certified that error appears in the above-identified patent and that said Letters Patent are hereby corrected as shown below:

Column 2, line 74, insert reference numeral -- 10 -- after "reinforcing strip".

Page 3, column 1, line 1, change reference numeral "9" after "plies" to -- 6 --.

Signed and sealed this 6th day of July 1971.

(SEAL)
Attest:

EDWARD M. FLETCHER, JR.                WILLIAM E. SCHUYLER, JR.
Attesting Officer                      Commissioner of Patents